United States Patent Office 3,824,249
Patented July 16, 1974

3,824,249
ACYLAMINO TETRAZOLES
Gilbert Regnier, Chatenay-Malabry, Roger Canevari, Villebon-sur-Yvette, and Jean-Claude Le Douarec, Royat, France, assignors to Societe en nom Collectif "Science Union et Cie Societe Francaise de Recherche
No Drawing. Filed May 24, 1972, Ser. No. 256,520
Claims priority, application Great Britain, June 15, 1971, 28,004/71
Int. Cl. C07d 55/56, 57/00
U.S. Cl. 260—308 D     3 Claims

ABSTRACT OF THE DISCLOSURE

Acyloamino tetrazoles of the formula:

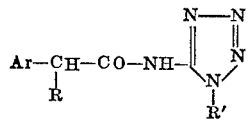

wherein

Ar is p-lower-alkylphenyl, p-cycloalkylphenyl, p-dialkylaminophenyl, p - cycloalkylaminophenyl, biphenylyl, halobiphenylyl, lower - alkylbiphenylyl, lower-alkoxy-biphenylyl, or lower-alkoxy-β-naphthyl;

R is hydrogen, methyl or ethyl, and R' is hydrogen, pyridyl, phenyl, halophenyl, lower-alkylphenyl or lower-alkoxyphenyl.

These compounds possess anti-inflammatory properties.

---

The present invention provides acylamino tetrazoles of the general formula I:

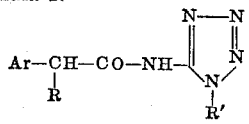

in which:

Ar is selected from the group consisting of:
a substituted phenyl radical of the general formula:

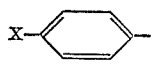

wherein X is selected from the group consisting of an alkyl radical having from 1 to 5 carbon atoms inclusive, a cycloalkyl radical having from 3 to 6 carbon atoms inclusive, a dialkylamino radical wherein each alkyl moiety, which may be the same or different, has from 1 to 5 carbon atoms inclusive, a cycloalkylamino radical having from 3 to 6 carbon atoms inclusive, a phenyl radical, a halophenyl radical, an alkylphenyl radical and an alkoxyphenyl radical wherein the alkyl and alkoxy moieties have from 1 to 4 carbon atoms inclusive; and
a β-naphthyl radical substituted by an alkoxy radical having from 1 to 5 carbon atoms inclusive;

R is selected from the group consisting of a hydrogen atom, a methyl radical and an ethyl radical, and R' is selected from the group consisting of a hydrogen atom, a pyridyl radical, a phenyl radical, a halophenyl radical, an alkylphenyl radical and an alkoxyphenyl radical wherein the alkyl and alkoxy moieties have from 1 to 5 carbon atoms inclusive.

The compounds of the present invention are new and are prepared by condensing an acid halide of the general formula II:

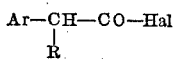

wherein Ar and R have the meanings given above and Hal represents a chlorine or bromine atom,
with an amino tetrazole of the general formula III:

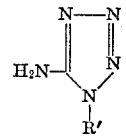

wherein R' has the meaning given above.

One of the most satisfactory ways of carrying out the process of the invention comprises heating the acid halide of the general formula II in solution in a weak polar aprotonic solvent, for example an ether, for example, tetrahydrofuran or dioxan, these last being eventually associated to an aromatic hydrocarbon having a low boiling point, for example benzene, with the amino tetrazole of the general formula III at a temperature within the range of from 50° to 100° C. The condensation may be carried out in the presence of an excess of the tetrazole of the formula II or of an organic tertiary base, for example, triethylamine or pyridine which acts as acceptor for the hydrohalic acid formed during the reaction.

The compounds of the general formula I are neutral or, in the case where the tetrazole ring is not substituted in the 1-position (R'=H), weakly acidic. The acidity of the 1-unsubstituted compounds may be utilised for their purification which comprises dissolving them in an alkali metal hydroxide solution, for example sodium or potassium hydroxide solution, and regenerating them by means of a strong mineral acid or acetic acid.

Neutral compounds may be purified by physical methods, for example chromatography or crystallisation in a suitable solvent.

The following Examples illustrate the invention, the melting points being determined in a capillary tube.

EXAMPLE 1

1-phenyl-5-(α-biphenyl-4-yl propionamido) tetrazole

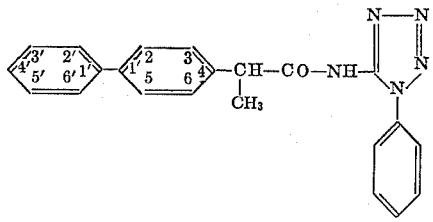

39.5 g. of α-biphenyl-4-yl propionyl chloride and 25.9 g. of 5-amino-1-phenyl tetrazole dissolved in 800 ml. of anhydrous tetrahydrofuran were boiled for seven hours in the presence of 20 g. of pyridine. Then, the crystals of pyridine hydrochloride which had formed were suctioned off and the solvent was evaporated under reduced pressure. The semi-crystalline residue was dissolved in 500 ml. of benzene and successively washed with two 100 ml. portions of a 10% $Na_2CO_3$ solution and then twice with 100 ml of a 10% hydrochloric acid solution. The mixture was dried, then the benzene was evaporated and the crystalline residue was recrystallized in 200 ml. of anhydrous ethanol. There were obtained 31.5 g. of 1-phenyl-5-(α-biphenyl-4-yl propionamido) tetrazole, white crystals melting at 162 to 163° C.

EXAMPLES 2–12

The following compounds were prepared according to the process described in Example 1.

2. 1-phenyl-5-(biphenyl-4-yl acetamido) tetrazole, M.P. 177–179° C., starting from biphenyl-4-yl acetyl chloride and 5-amino-1-phenyl tetrazole.